United States Patent [19]

Lehnert

[11] 4,450,386
[45] May 22, 1984

[54] ELECTRONIC TELEVISION PICTURE FRAMING CIRCUIT

[75] Inventor: Stanley E. Lehnert, Addison, Ill.

[73] Assignee: Zenith Radio Corporation, Glenview, Ill.

[21] Appl. No.: 325,783

[22] Filed: Nov. 30, 1981

[51] Int. Cl.³ .............................................. H01K 29/56
[52] U.S. Cl. ..................................... 315/371; 315/384
[58] Field of Search ............ 315/371, 370, 368, 13 C, 315/384; 358/165, 176, 33, 37, 166

[56] References Cited

U.S. PATENT DOCUMENTS

| | | | |
|---|---|---|---|
| 3,040,126 | 6/1962 | Newell | 358/165 |
| 3,459,992 | 8/1967 | Griffey | 315/384 |
| 4,348,617 | 9/1982 | Miyazaki et al. | 315/370 |

*Primary Examiner*—Theodore M. Blum
*Assistant Examiner*—Brian Steinberger

[57] ABSTRACT

An electronic image framing circuit is described for eliminating the visible effects of pincushion distortion at the edges of a television image. Toward this end, portions of video lines which extend beyond a selected straight line image boundary are blanked by a pulse processor. The pulse processor responds to conventional horizontal rate and vertical rate pulses for developing blanking pulses whose widths are varied at a vertical rate. The modified blanking pulses are applied to a conventional blanking circuit for blanking the portions of video lines which extend beyond the desired image area. A parabola generator is also described for use in developing the modified blanking pulses.

11 Claims, 11 Drawing Figures

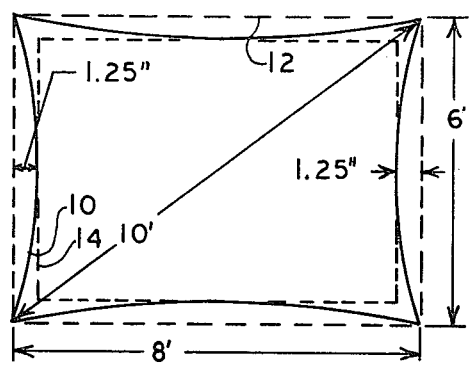
FIG. 1
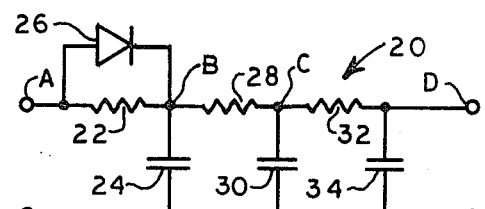
FIG. 3
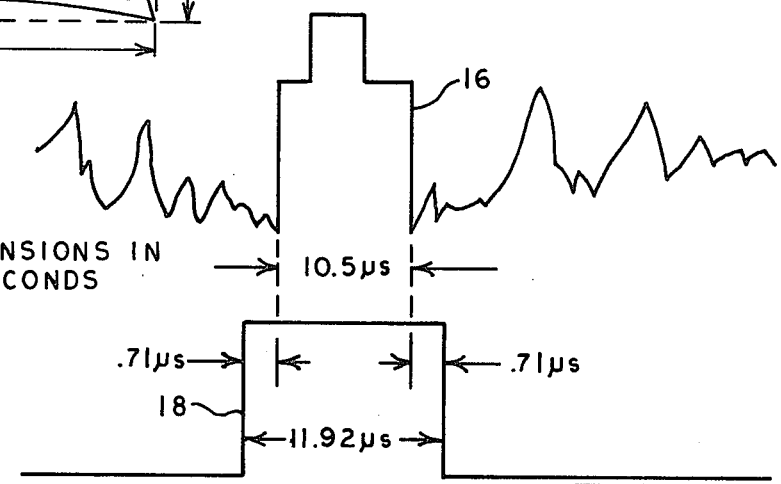
ALL DIMENSIONS IN MICRO-SECONDS
FIG. 2
A
B
C
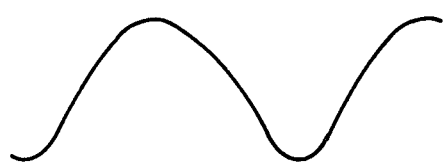
D
FIG. 4

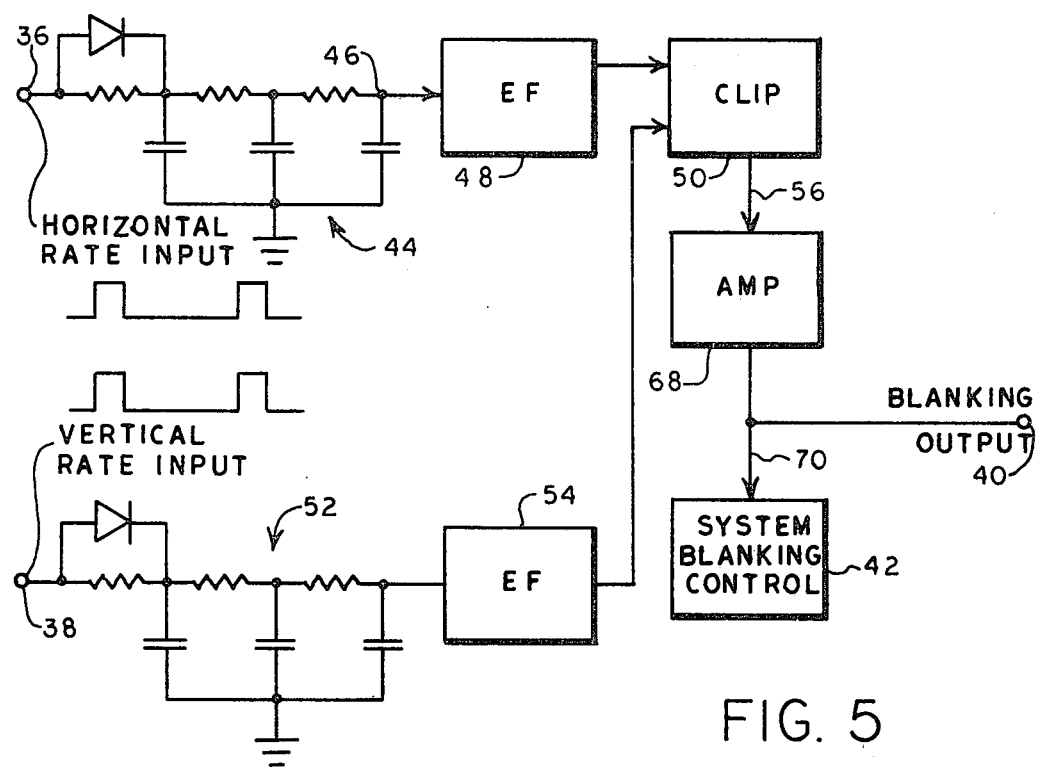
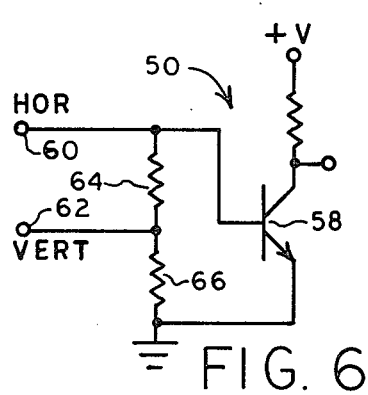
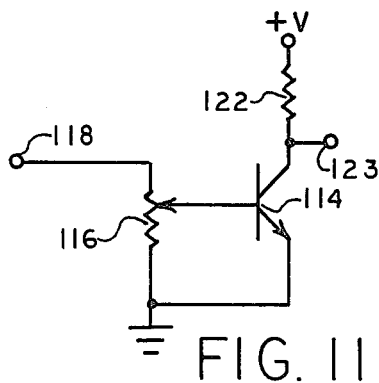
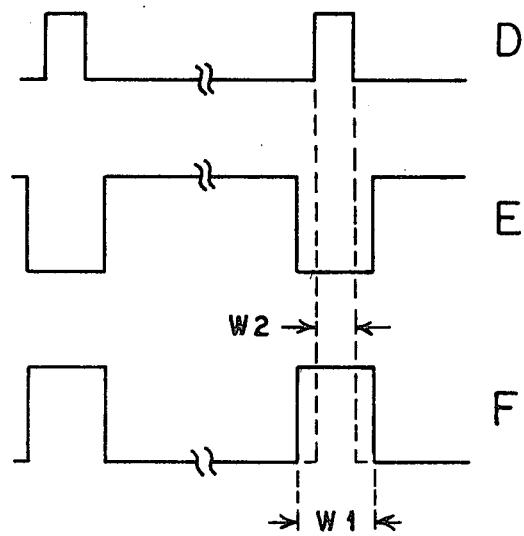
FIG. 5
FIG. 6
FIG. 7
FIG. 11

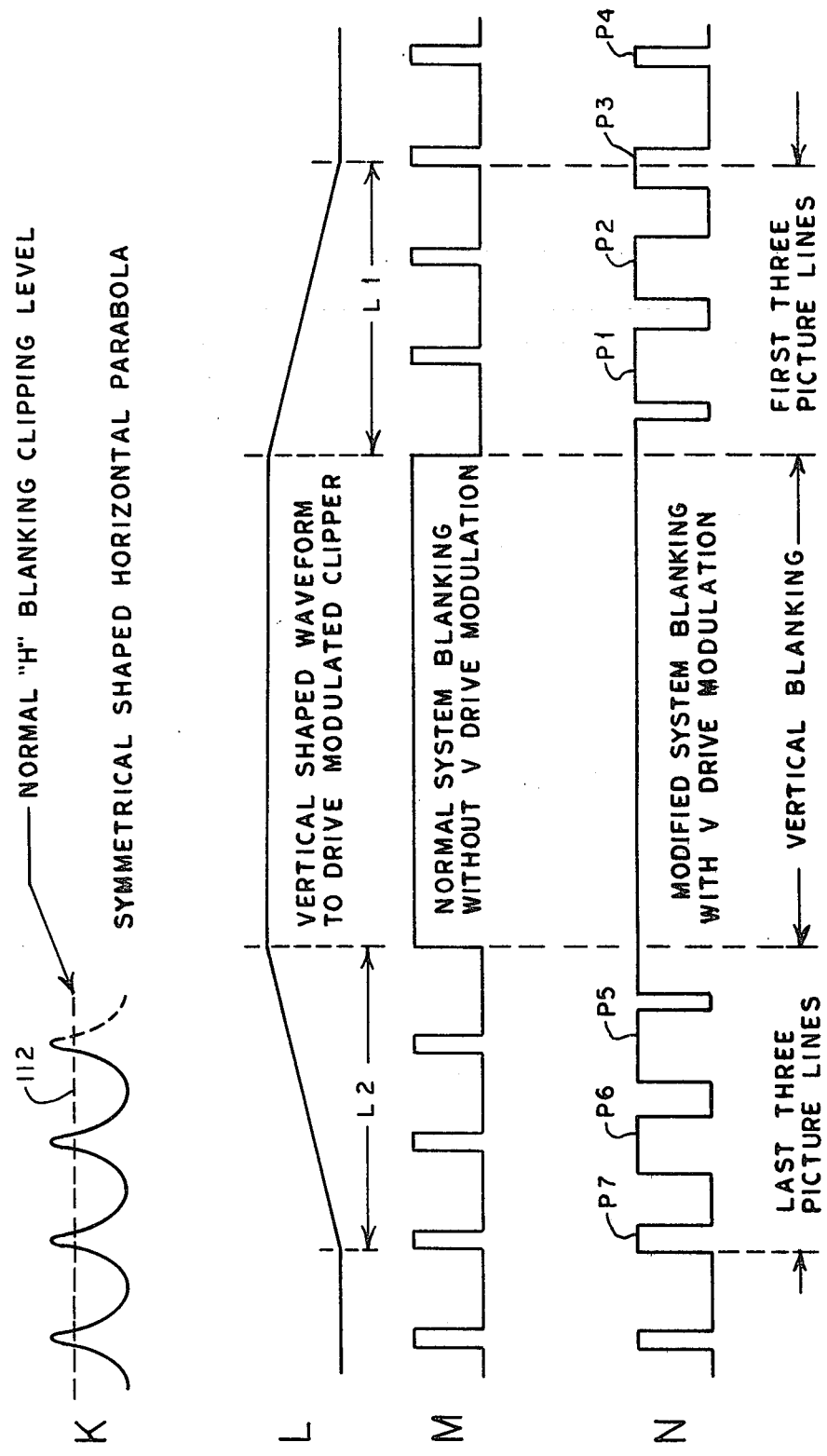

ELECTRONIC TELEVISION PICTURE FRAMING CIRCUIT

BACKGROUND OF THE INVENTION

This invention relates generally to improvements in television receivers, and more particularly to a system for straightening the edges of a television image to eliminate the effects caused by pincushion distortion.

Present television receivers normally include circuitry which compensates for the so-called "pincushion" effect. Such compensation is conventionally achieved, at least to some extent, by proper design of the receiver's deflection yoke and/or by properly modulating the current in the deflection yoke. See, for example, U.S. Pat. Nos. 3,962,603, 4,225,809, 4,254,365 and 4,254,366, and U.K. Pat. No. 1,585,465. Although such pincushion correction schemes provide acceptable television images, they do not usually provide a completely corrected image. More nearly perfect image correction can be provided only with a substantial cost penalty.

The imperfections in the present state of pincushion correction are usually not detectable by a viewer who sees only the active trace area of the image. The border or edges of the image, where pincushion effects are quite noticeable, is usually masked by an escutcheon or the receiver cabinet.

In conventional projection television systems, the border of the projected image, and the pincushion distortion which occurs there, may be masked by causing the image edges to overlie a non-reflective border on the projection screen. Hence, the viewer is normally unaware of the edge distortion which would otherwise be very obvious in such a magnified image. As discussed below, however, the inclusion of a non-reflective border is sometimes impractical.

In certain large scale projection television systems where, for example, a television image is projected onto a wall to develop a six foot by eight foot image, it is impractical to provide a large non-reflective border on the wall to mask the imperfection in the edges of the image. If no provision for edge correction is provided, however, the distorted edges of the projected image will be readily apparent, and probably objectionable, to a viewer.

A related problem arises from the manner in which pincushion correction is typically achieved. In the usual case, vertical rate pulses are applied to circuitry which converts each such pulse to a parabolic waveform. The parabola, in turn, may be used to modulate the current in the receiver's deflection yoke. The circuitry which develops the parabola frequently requires active devices and/or multiple phase inputs, both of which are undesirable. In addition, high insertion loss and a lack of symmetry in the parabola can result from the use of such conventional circuits. Hence, edge correction of the type considered herein, which preferably employs parabola generating circuitry, is neither efficiently nor accurately achieved with conventional circuitry.

For the foregoing reasons, conventional circuitry and systems for effecting pincushion correction are neither cost effective nor readily applicable to the problem of straightening the edges of a large projected television image.

OBJECTS OF THE INVENTION

It is a general object of the invention to provide an improved system for reducing the effects of pincushion distortion at the edges of a television image.

It is a more specific object of the invention to provide a system which straightens the edges of a large projected television image without incurring the disadvantages of conventional pincushion correction techniques.

It is another object of the invention to provide an improved parabola generating circuit for use in edge correction systems and other systems where a highly symmetric parabola is desired.

BRIEF DESCRIPTION OF THE DRAWINGS

The objects stated above and other objects of the invention are set forth more particularly in the following detailed description and in the accompanying drawings, of which:

FIG. 1 illustrates the boundaries of a projected television image and its deviation from a straight line boundary due to pincushion distortion, and shows a smaller straight line image boundary obtained by a picture framing circuit according to the invention;

FIG. 2 shows a standard blanking pulse and a blanking pulse modified according to the invention to illustrate how portions of video lines may be blanked for framing the projected television image;

FIG. 3 is a circuit diagram of parabola generator for use in developing modified blanking pulses according to an aspect of the invention;

FIG. 4 illustrates waveforms useful in explaining the operation of the parabola generator;

FIG. 5 illustrates an image framing circuit which provides east-west image framing according to the invention;

FIG. 6 is a circuit diagram of a clipping network used in the image framing circuit of FIG. 5;

FIG. 7 shows waveforms useful in describing the operation of the clipper depicted in FIG. 6;

FIG. 10 depicts various waveforms useful in describing the operation of the image framing circuit shown in FIG. 9; and FIG. 11 is a circuit diagram depicting how certain clippers shown in FIG. 10 may be constructed.

DESCRIPTION OF THE PREFERRED EMBODIMENT

Figure 8:
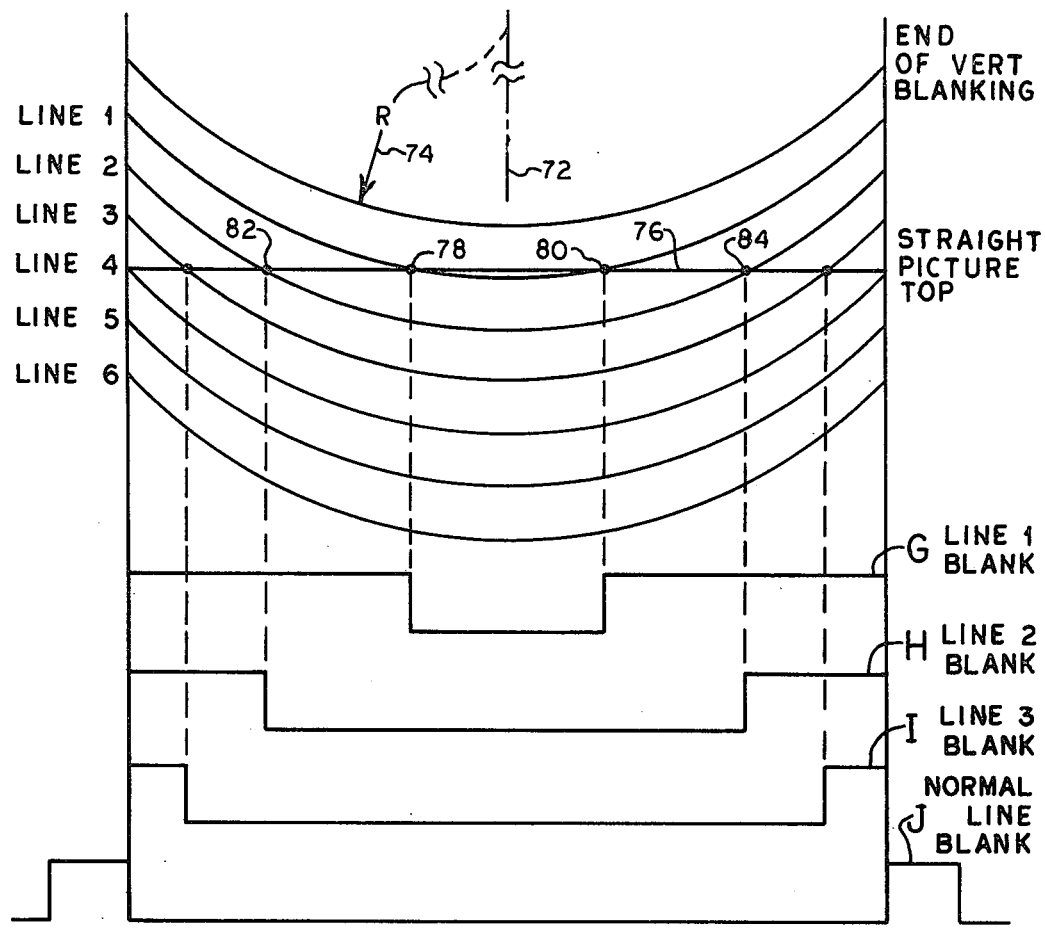
FIG. 8 illustrates several video lines which extend partly above the upper boundary of the desired image area, and blanking pulses for blanking those video lines to electronically frame the image within the desired image area according to the invention.

Referring to FIG. 1, the geometry of a six foot by eight foot projected television image is indicated by the solid line 10. Because of inherent pincushion distortion, the side edges of the image (in the east-west direction) are bowed inwardly by about 1.25 inches as measured at the vertical midpoint. Similar distortion causes the north-south edges of the projected image to be bowed inwardly.

If pincushion distortion could be completely eliminated, the projected image might have the geometry indicated by the dashed line rectangle 12. In direct view television systems and rear projection systems using a framed screen, such a rectangular image is displayed because the bowed edges of the image are physically masked from the viewer. To develop a rectangular geometry for a large unframed projected image, however, such masking is frequently impractical.

To overcome this problem in an economical manner, the present invention blanks video lines or portions thereof which extend beyond a desired image boundary. In FIG. 1, this desired image boundary is shown by the dashed line rectangle 14, the east-west boundaries of which may be defined by the extremities of the image line located at the vertical midpoint of the image. The north-south boundaries of the desired image area (rectangle 14) may be defined by the locations of maximum bow for the top and bottom video lines. Thus, the portion of the projected image which lies between the rectangle 14 and the uncorrected image boundary 10 is electronically blanked, thereby "framing" the projected image within the straight line boundaries of the rectangle 14. Stated another way, the width of horizontal line blanking intervals are modified so as to cause the start and finish of each of the displayed active video lines to be coincident with the boundaries of the rectangle 14.

To frame the top line of the displayed image in an east-west direction, the width of its horizontal rate blanking pulse is widened by symmetrically increasing the time interval between its leading edge and trailing edge. This results in a proportional decrease in the length of the displayed line so that the displayed start and finish of the top line of video are coincident with the east-west boundaries of the rectangle 14. Because the second line of video does not extend beyond the east-west boundaries of the rectangle 14 to the extent that the top line does, its blanking pulse is widened to a lesser extent. Similar variations in the pulse width of the blanking pulses for the other video lines is effected to bring them into line with the boundaries of the rectangle 14. In general, the width variations of the blanking pulses occur as a curvilinear function as one proceeds through the vertical scan. This curvilinear function is the inverse of the inherent pincushion distortion of the system and is periodic at the vertical field scanning rate.

To further illustrate the manner in which blanking is used to electronically frame the projected image, reference is made to FIG. 2. This figure illustrates a standard or nominal blanking pulse 16 whose width is 10.5 microseconds. Also shown is a modified blanking pulse 18 whose width has been increased according to the invention to reflect the additional blanking required for the top line of video in FIG. 1. As shown, the pulse 18 brackets or straddles the pulse 16, and its leading and trailing edges have each been extended outwardly by 0.71 microseconds. This increased width of the blanking pulse 18 is needed to blank the left and right ends of the first video line (FIG. 1) which each extend beyond the rectangle 14 by 1.25 inches. By symmetrically varying the width of a blanking pulse, both ends of a video line may be blanked by the same amount.

It should be noted that if the inherent pincushion distortion in the system is symmetrical, similar blanking pulses will be required for the top and bottom lines of video. Intermediate lines require blanking pulses which narrow as picture center is approached, but the blanking pulse width for the picture center line will normally have the same width as the nominal blanking pulse 16.

As is apparent from the discussion above, it is desirable to generate a modified blanking pulse which straddles the nominal or standard blanking pulse. The modified blanking pulse can then be widened symmetrically by a single control to achieve the proper degree of blanking. According to one aspect of the invention, a passive network, comprising a three stage resistance-capacitance network and a diode, is employed in the generation of a straddling pulse. This network, described in more detail below, converts a pulse input to a symmetrical parabolic waveform which is then clipped to provide a straddling pulse such as the pulse 18 in FIG. 2.

Referring to FIG. 3, a circuit 20 is shown for receiving a periodic pulse train at an input A and for converting each received pulse to a parabolic waveform at an output D. Waveforms A, B, C and D of FIG. 4 represent the signals occurring at nodes A–D, respectively, of the circuit 20.

The illustrated circuit comprises three serially connected resistance-capacitance networks, each of which may be thought of as an integrator or a low pass filter. The first network includes a resistor 22 coupled between nodes A and B and a capacitor 24 coupled between node B and ground. A diode 26 is coupled in parallel with the resistor 22.

A resistor 28 and a capacitor 30 constitute the second network. The third network includes a resistor 32 coupled between nodes C and D and a capacitor 34 coupled from node D to ground.

As indicated by waveforms A and D in FIG. 4, the parabola at output node D is symmetrical with respect to the input pulses, and the low point of each parabola is centered with respect to its corresponding input pulse. In addition, the diode 26, being in parallel with resistor 22, substantially decreases the circuit's insertion loss. When the diode is non-conductive, the circuit 20 operates basically as a three stage integrator. However, when the input pulse goes positive, the diode conducts and the input pulse essentially bypasses the first stage and is affected by only a two stage cascaded integrator, thereby raising the amplitude of the signal at node D.

Two parabola generators of the type discussed above are employed in the preferred embodiment of an electronic image framing circuit for east-west correction. These same two parabola generators can be used in an electronic image framing circuit for north-south correction.

Turning first to the image framing circuit shown in FIG. 5 which provides east-west correction, this circuit is in the form of a pulse processor receiving horizontal rate pulses at an input 36 and vertical rate pulses at an input 38. All such inputs are normally available in a conventional television receiver. In general, the pulse processor responds to the horizontal and vertical rate inputs by developing, at an output 40, blanking pulses whose widths are varied at a vertical rate for blanking the portions of each video line which extend beyond the desired image boundary. These blanking pulses are coupled to a conventional system blanking control 42 which operates to blank portions of video lines as determined by the width of the blanking pulses.

Receiving the horizontal rate pulses at input terminal 36 is a parabola generator 44 which is similar to the one shown in FIG. 3. The output of the generator 44 is a horizontal rate parabolic waveform at node 46 which may be coupled to an emitter follower 48. The output of the latter device, having essentially the same waveforms as the signal at node 46, is applied to one input of a clipper 50.

The other input to the clipper 50 is derived from the vertical rate pulses received at node 38. These pulses are converted to a corresponding number of vertical rate parabolas by a second parabola generator 52. An emitter follower 54 may couple these parabolas to the other input of the clipper 50.

The function of the clipper 50 is to clip the parabolic waveforms received from emitter follower 48 so as to develop blanking pulses on lead 56, and to respond to the vertical rate parabolas received via the emitter follower 54 for width modulating the blanking pulses at a vertical rate. The modulation imposed on the blanking pulses causes their widths to be varied such that portions of video lines which extend beyond the boundaries of the desired image area are blanked. Video within the image area is left unblanked.

The clipper 50 may be of the type shown in FIG. 6. This illustrated clipper includes a grounded emitter transistor 58 whose base receives horizontal rate parabolas from the emitter follower 48 at an input terminal 60. Vertical rate parabolas from the emitter follower 54 are applied to another input terminal 62. A pair of resistors 64 and 66 are coupled between terminal 60 and ground, with the terminal 62 being coupled to the junction between resistors 64 and 66. With this arrangement, the peaks of the horizontal rate parabolas are clipped to develop the blanking waveform E shown in FIG. 7 in response to each horizontal rate pulse D applied to input 36. As shown, each blanking pulse (waveform E) straddles a corresponding horizontal rate input pulse. The vertical rate parabola received from the emitter follower 54 changes the clipping level at a vertical rate to symmetrically change the width of the blanking pulses at lead 56.

The effect of the vertical rate parabolas is illustrated by waveform F of FIG. 7. As shown, the modified blanking pulses on lead 56 (FIG. 5) are varied in width at a vertical rate between a maximum width W1 and a minimum width W2. For the top and bottom video lines, the modified blanking pulses will have the maximum width W1. For the middle vertical line, the width of the modified blanking pulse will normally be W2 which corresponds to the width of a nominal blanking pulse. For video lines between the center of the active scan and the top/bottom of the image, the width of the modified blanking pulses varies between W1 and W2. Thus, the width of each such modified blanking pulse corresponds to the distance by which its corresponding video line extends beyond the boundary of the desired image area.

The modified blanking pulses appearing on lead 56 (FIG. 5) may not have rapid enough rise and fall times for effective blanking. In that case, the blanking pulses may be input to a conventional amplifier 68 whose output at terminal 40 consists of width-modulated blanking pulses having more rapid rise and fall times. These pulses at terminal 40 are coupled via a lead 70 to the conventional system blanking control 42 in the television receiver. In response to each pulse received via the lead 70, the blanking control 42 blanks the edges of a line of video to the extent dictated by the width of the received blanking pulse. In this manner, the projected television image is framed within the east-west boundaries of the desired image area.

To frame the projected image within the north-south boundaries of the desired image area, a selectable number of width-modulated horizontal blanking pulses are provided. These pulses are used to blank portions of upper and lower video lines which extend beyond the desired image area.

To illustrate the type of blanking pulses required for this purpose, reference is made to FIG. 8. The vertical line 72 indicates the image midpoint in the horizontal direction and the line 74 indicates the radius of curvature for the top active lines of the projected image. For a 6 foot by 8 foot projected image, this radius of curvature, due to imperfect pincushion correction, is typically about 920 inches.

Also shown in FIG. 8 are video lines 1–6 associated with the top of the image. These lines sag or bow inwardly with respect to a straight horizontal line 76 which represents the top boundary of the desired image area. With the radius of curvature shown, line 1 of the video image may sag below the line 76 by about 1.25 inches (for a 6 foot by 8 foot image). It can be seen, therefore, that portions of video lines 1, 2 and 3 extend above the desired upper boundary of the image. As discussed more fully below, each such extension of a video line is blanked so that all video which would otherwise appear above the line 76 is electronically masked.

The type of blanking pulses employed for north-south correction are depicted as waveforms G, H and I in FIG. 8, and the nominal line blanking pulse is depicted as waveform J. As shown, waveform G is widened symmetrically to blank the portions of video line 1 which extends above the line 76. That is, the portions of line 1 which begin at boundary intersection points 78 and 80 and which extend therefrom above the line 76 are blanked by the blanking waveform G. Similarly, the portions of line 2 which begin at boundary intersection points 82 and 84 and extend upwardly therefrom are blanked by waveform H. Waveform I provides similar blanking for the third line of video.

In the projected image which is illustrated, extra blanking is not required for video line 4 and subsequent lines since their upper extremities do not extend above the image boundary line 76. It should be understood, however, that the bottom portion of the image (not shown) includes pincushion distortion which mirrors the distortion associated with the top of the image. Hence, modification to horizontal blanking at picture bottom is also required.

In actual practice, the double interlaced system of scanning results in the present example, in six active lines at the top of the image which require correction. In addition, variations from system to system will result in different numbers of video lines to be corrected. The system discussed below provides selection of the number of active lines which may be corrected by blanking in order to accommodate the needs of different systems which may have different amounts of pincushion distortion.

Figure 9:
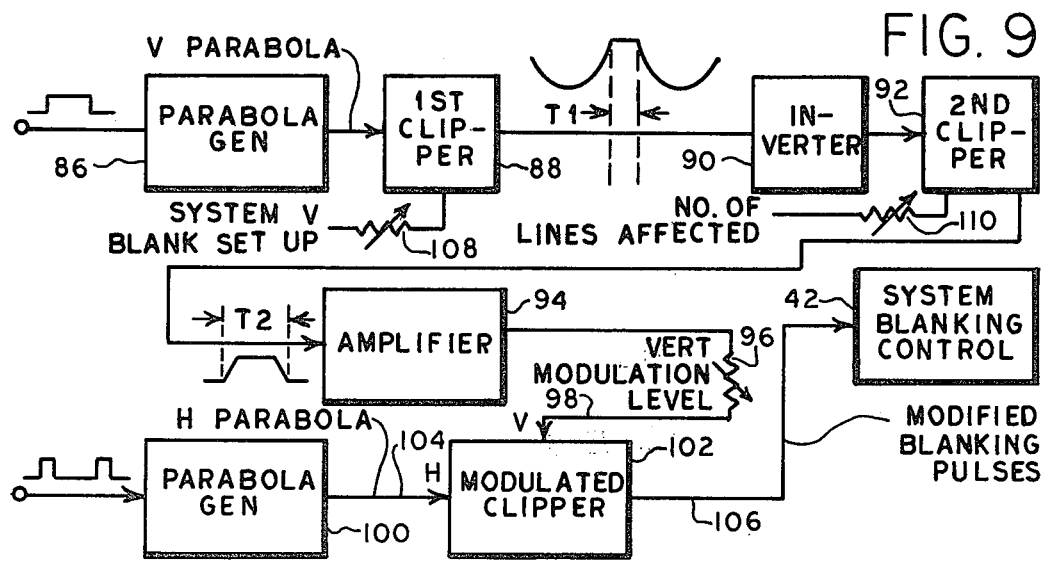
FIG. 9 illustrates an image framing circuit which provides north-south image framing according to the invention.

Referring now to FIG. 9, a pulse processor is shown for effecting north-south image framing in accordance with the principles discussed above. The illustrated processor includes a first parabola generator 86 receiving vertical rate pulses, a first clipper 88 receiving the output of the parabola generator 86, an optional inverter 90, a second clipper 92 coupled to the output of the inverter 90, an optional amplifier 94, and a modulation level control in the form of a variable resistor 96. In general, these components of the pulse processor respond to the vertical rate pulses received by the parabola generator 86 for developing a modulating signal on a lead 98, which modulating signal is representative of the number of video lines which extend beyond the north-south boundaries of the desired image area. The waveform of the signal developed on lead 98 also controls the portions to be blanked of the video lines requiring blanking.

The illustrated processor also includes a second parabola generator 100 which receives horizontal rate pulses, a modulated clipper 102 receiving the output of the generator 100 via a lead 104 and the modulating signal carried by lead 98, and an output lead 106 for carrying width-modulated blanking pulses to the conventional system blanking control 42. As discussed more fully below, this portion of the processor responds to the horizontal rate pulses applied to the generator 100 for developing blanking pulses on the lead 106 and for varying the width of those blanking pulses so that the blanking pulses are adapted to blank portions of video lines which extend beyond the north-south boundaries of the desired image area.

Referring more specifically to the generator 86, it is preferably constructed as shown in FIG. 3 to develop a symmetrical vertical rate parabola at the input to the clipper 88. The clipper 88 clips the positive peaks of these parabolas to develop the waveform illustrated at the clipper's output. A system set-up control, indicated schematically by a variable resistor 108, is preferably provided for setting the level at which the clipper 88 operates in order to establish a nominal system blanking interval $T_1$.

After being inverted (if necessary) by the inverter 90, the clipped parabola is clipped again by the second clipper 92. A clipping level control, indicated schematically by a variable resistor 110, is preferably included to set the operating point of the clipper 92 so that the output waveform, illustrated between the clipper 92 and the amplifier 94, has a time interval $T_2$ representative of the number of active video lines whose blanking interval is to be modified. The variable resistor 110 may be used to vary the interval $T_2$ as needed for a given amount of pincushion distortion.

The output of the clipper 92 may be applied to a conventional amplifier 94 to account for the sensitivity of the modulated clipper 102 and the time interval over which a blanking width change is required. The variable resistor 96 may control the gain or output level of the amplifier 94 to set the level of modulation.

The parabola generator 100 is preferably constructed as shown in FIG. 3 to convert horizontal rate input pulses to symmetrical, horizontal rate parabolas on the lead 104. The clipper 102 clips each parabola received via the lead 104 in accordance with the modulated clipping level established by the signal on the lead 98. Thus, the signal on output lead 106 is a blanking pulse whose width is varied at a vertical rate.

Referring to FIG. 10, waveform K illustrates the horizontal rate parabola received by the clipper 102 and the dashed line 112 represents the clipping level to be used to generate a nominal blanking pulse on the lead 106. Waveform L illustrates the vertical rate modulating signal on lead 98, waveform M represents normal system blanking pulses, and waveform N represents the blanking pulses generated on lead 106 in response to the modulating waveform L. As shown, the interval L1 of the waveform L causes the clipper 102 to change its clipping level so that widened blanking pulses P1, P2 and P3 are developed for blanking the portions of the first three lines of video which extend above the north boundary of the desired image area. The pulse P4 is of nominal width because, in the example shown in FIG. 8, the fourth video line is entirely within the desired image area. Because of the symmetry of waveform L, the interval L2 thereof causes a similar widening of blanking pulses P5, P6 and P7 to blank portions of the bottom three video lines. A greater or lesser number of video lines may be blanked by adjusting the variable resistor 110.

Returning to FIG. 9, the modulated blanking pulses carried by lead 106 are coupled to the system blanking control 42, the same control which is depicted in FIG. 5.

The construction of the clippers 88, 92 and 102 may be conventional. As shown in FIG. 11, for example, the clipper 88 may include a transistor 114 having a grounded emitter. The base of this transistor may be coupled to the wiper arm of a variable resistor 116 which receives vertical rate parabolas via terminal 118. The clipped output of the transistor 114 is developed across a load resistor 122 and coupled to the second clipper via terminal 123.

The clipper 92 may also be constructed as shown in FIG. 11. The modulated clipper 102 may be constructed as shown in FIG. 6, in which case the horizontal rate parabolas are coupled to terminal 60 and the modulating signal on lead 98 (FIG. 9) is coupled to terminal 62.

The construction of the parabola generators is preferably effected such that each resistance-capacitance network therein contributes about 60 degrees of phase shift to provide a total phase shift of about 180 degrees. When used to develop a horizontal rate parabola, each resistor may be selected to have a value of about 6.8 thousand ohms and each capacitor may be selected to have a value of about 0.0068 microfarads. For the vertical rate parabola generator, each resistor may have a value of about 470 thousand ohms, and each capacitor may have a value of about 0.033 microfarads.

Although the pulse processors of FIGS. 5 and 9 may be used separately to achieve either east-west or north-south correction, it is preferred that both processors be combined to provide total image framing, particularly for use in a projection television system.

An advantage of the image framing circuit described above is that it may be easily included as an add-on to a television system and embodied in a single circuit board. For systems where image framing is not desired, that circuit board may be easily eliminated from the television system.

As for the parabola generator, it may be used in a variety of other applications where it is desired to develop a symmetrical bracket pulse at relatively low cost.

Although the invention has been described in terms of a preferred embodiment, it will be obvious to those skilled in the art that many alterations and modifications may be made without departing from the invention. Accordingly, it is intended that all such alterations and modifications be considered as within the spirit and scope of the invention as defined by the appended claims.

What is claimed is:

1. In a television system which develops horizontal rate pulses and vertical rate pulses for application to a blanking control circuit, an electronic image framing circuit for eliminating the effects of pincushion distortion at the edges of a television image, comprising:

a pulse processor responsive to the horizontal and vertical rate pulses for developing blanking pulses whose widths are varied at a vertical rate for blanking the portions of each video line which extend beyond a desired image boundary; and means for coupling the blanking pulses to the blanking control circuit.

2. An image framing circuit as set forth in claim 1 wherein said pulse processor includes:

a first parabola generator receiving the horizontal rate pulses for shaping each such pulse to a parabolic waveform; and circuit means receiving the parabolic waveform and the vertical rate pulses for converting the parabolic waveforms to blanking pulses which straddle the horizontal rate pulses and which are symmetrically width-modulated at a vertical rate for blanking individual lines of video which extend beyond a desired east-west boundary of the video image.

3. An image framing circuit as set forth in claim 2 wherein said circuit means includes a clipper for clipping horizontal rate parabolic waveforms at selected amplitude levels.

4. An image framing circuit as set forth in claim 3 wherein said circuit means further includes a second parabola generator receiving the horizontal rate pulses for shaping each such pulse to a parabolic waveform, and means for applying vertical rate parabolic waveforms to said clipper such that the blanking pulses developed by the clipper are width-modulated at a vertical rate.

5. An image framing circuit as set forth in claim 2 wherein said parabola generator comprises three serially connected resistance-capacitance networks and a diode connected in parallel with the resistance associated with the first resistance-capacitance network.

6. An electronic image framing circuit as set forth in claim 1 wherein said pulse processor includes:

first means responsive to the vertical rate pulses for developing a modulating signal representative of a number of video lines which extend beyond the north-south extremities of the image boundary; and second means responsive to the horizontal rate pulses for developing blanking pulses and responsive to the modulating signal for varying the width of blanking pulses so that the width modulated blanking pulses are adapted to blank portions of video lines which extend beyond north-south extremities of the image boundary.

7. The electronic image framing circuit as set forth in claim 6 wherein said first means includes a parabola generator responsive to vertical rate pulses for converting each such pulse to a parabolic waveform, and means for clipping the parabolic waveforms to develop the modulating signal.

8. An electronic image framing circuit as set forth in claim 7 wherein said clipping means includes a first clipper for clipping the parabolic waveforms to develop a clipped signal representative of nominal blanking width, and a second clipper for clipping the previously clipped signal so as to develop a modulating signal those waveform is indicative of the number of video lines to be blanked and the portions thereof to be blanked.

9. An electronic image framing circuit as set forth in claim 7 wherein said second means includes a parabola generator responsive to horizontal rate pulses for converting each such pulse to a parabolic waveform, and clipping means for clipping horizontal rate parabolic waveforms to develop blanking pulses and for varying the width of the blanking pulses in response to the modulating signal.

10. In a television system which develops horizontal rate pulses and vertical rate pulses for application to a blanking control circuit, an electronic image framing circuit for eliminating the effects of pincushion distortion at the edges of a television image, comprising:

means for converting each horizontal rate pulse to a parabola;

means for converting each vertical rate pulse to a parabola;

means for clipping the vertical rate parabolas to develop a modulating signal whose waveform is representative of the video lines and the portions thereof to be blanked;

a modulated clipper responsive to the horizontal rate parabolas for clipping the same to develop blanking pulses, and responsive to the modulating signal for symmetrically varying the widths of blanking pulses so that the widths of the latter pulses correspond to the portions of video lines to be blanked; and means for coupling the blanking pulses to the blanking control circuit, whereby portions of video lines which extend beyond north-south extremities of the image boundary are blanked.

11. In a television system which develops horizontal rate pulses and vertical rate pulses for application to a blanking control circuit, an electronic image framing circuit for eliminating the effects of pincushion distortion at the edges of a television image, comprising:

a first parabola generator receiving the horizontal rate pulses for converting the same to parabolic waveforms;

a second parabola generator receiving the vertical rate pulses for converting the same to parabolic waveforms;

means receiving the horizontal rate and vertical rate parabolic waveforms for converting horizontal rate parabolic waveforms to blanking pulses which symmetrically straddle horizontal rate pulses and for varying the widths of the blanking pulses at a vertical rate such that the widths of the blanking pulses vary in accordance with the extent that a corresponding line of video extends beyond a desired image boundary; and means for coupling the blanking pulses to the blanking control circuit, whereby lines of video which extend beyond east-west boundaries of the desired image area are blanked.

* * * * *